United States Patent
Diehl et al.

(10) Patent No.: US 12,146,075 B2
(45) Date of Patent: Nov. 19, 2024

(54) LOW VOC UNIVERSAL COLORANT COMPOSITIONS

(71) Applicant: SWIMC LLC, Cleveland, OH (US)

(72) Inventors: Donald Diehl, Beecher, IL (US); Jacob S. Donlon, Chesterton, IN (US); Patricia L. Olofsson-Elkow, Frankfort, IL (US); Jean E. Shanks, Schererville, IN (US); Sarah Arcella, Crown Point, IN (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/339,545

(22) Filed: Jun. 22, 2023

(65) Prior Publication Data

US 2023/0416542 A1 Dec. 28, 2023

Related U.S. Application Data

(60) Provisional application No. 63/366,787, filed on Jun. 22, 2022.

(51) Int. Cl.
*C09D 7/65* (2018.01)
*C09D 17/00* (2006.01)

(52) U.S. Cl.
CPC ............. *C09D 7/65* (2018.01); *C09D 17/001* (2013.01)

(58) Field of Classification Search
None
See application file for complete search history.

(56) References Cited

U.S. PATENT DOCUMENTS

| | | |
|---|---|---|
| 4,056,402 A | 11/1977 | Guzi, Jr. |
| 4,127,422 A | 11/1978 | Guzi, Jr. et al. |
| 7,659,340 B2 | 2/2010 | Coward et al. |
| 8,242,206 B2 | 8/2012 | Coward et al. |
| 10,557,053 B2 | 2/2020 | Reisacher et al. |
| 2017/0174924 A1* | 6/2017 | Donlon .............. C09D 17/002 |
| 2018/0086917 A1* | 3/2018 | Wallace ................. C09D 7/63 |
| 2019/0031904 A1 | 1/2019 | Reisacher et al. |
| 2019/0194488 A1* | 6/2019 | Favresse ............. C08G 59/682 |
| 2021/0062006 A1 | 3/2021 | Wallace et al. |
| 2023/0265303 A1* | 8/2023 | Guo ..................... D06P 1/5271 |
| | | 347/100 |

FOREIGN PATENT DOCUMENTS

| | | |
|---|---|---|
| WO | 2016040641 A1 | 3/2016 |
| WO | 2018189426 A1 | 10/2018 |
| WO | 2023150772 A1 | 8/2023 |

OTHER PUBLICATIONS

Datasheet for BYK 190 (Year: 2023).*
International Search Report and Written Opinion from PCT Application No. PCT/US2023/025945 dated Oct. 4, 2023.

* cited by examiner

*Primary Examiner* — Robert T Butcher

(57) ABSTRACT

A universal colorant composition compatible to tint waterborne and solvent-borne base paints and stains. The universal colorant composition includes one or more modified polyether dispersants with one or more pigment affinic groups, which wet, disperse, and stabilize the disperse included pigments. The universal colorant compositions provide for low viscosity drop and excellent compatibility when the colorant composition is used to tint a base paint or stain.

21 Claims, No Drawings

LOW VOC UNIVERSAL COLORANT COMPOSITIONS

REFERENCE TO PRIOR APPLICATIONS

This application claims priority to U.S. Provisional Patent Application No. 63/366,787, filed on Jun. 22, 2022, the entirety of which is incorporated by reference.

BACKGROUND

Architectural paints and stains are typically distributed in a limited number of base paint or stain colors. To accommodate customer desires for custom paint colors, and to allow for matching to existing painted or stained surfaces, manufactures tint the distributed base paints or stains using one or more colorant compositions. Colorant compositions often are distributed in an array of 12 to 20 or more colors, each colorant composition including a different color pigment to impart a different color to the base paint or stain. By volumetrically adding one or more colorant compositions to a base paint or a stain using color custom tinting equipment and thoroughly mixing, the base paint or stain may be tinted to a desired color. To achieve homogeneity of color in the base paint or stain, the pigment must be homogenously dispersed throughout the base paint or stain, which historically has occurred by wetting the pigment with one or more surfactants present in the colorant composition.

Historically, base paints and stains were all solvent-borne, but water-borne latex paints and stains have become increasingly common. Conventionally, to accommodate tinting of both solvent-borne and water-borne base paints and stains, a separate array of solvent-borne colorant compositions was used for tinting solvent-borne base paints and stains, and a separate array of water-borne colorant compositions were formulated and used to tint water-borne base paints or stains. Although the trend has increasingly shifted to water-borne paints and stains, some end users continue to prefer solvent-borne alkyd paints and stains for certain applications.

To simplify distribution and use, universal colorant compositions have been developed that can be used to tint both water-borne and solvent-borne base paint and stains. Universal colorant compositions are typically formulated by modifying a nominally water-borne colorant composition to make it capable of tinting and dispersing pigments in the colorant composition in either a water-borne or a solvent-borne base paint or stain by including appropriate surfactants, as well as dispersants and co-solvents, in the colorant composition.

Surfactants in a colorant composition help to disperse, wet, and stabilize dry pigments in a liquid carrier. Dispersing of pigments occurs by assisting in the grinding of pigments through high mechanical shear in a media mill. Wetting of a pigment occurs by displacing the pigment-carrier solid-air interface with a solid-liquid interface (pigment-carrier). The presence of micelles by inclusion of surfactants in a colorant composition can help to stabilize the pigment in the composition both before and after addition to a base paint or stain. Based on the hydrophobic/lipophilic balance of the one or more surfactants used, a formulated colorant composition can be tailored to be compatible for performance in solvent-borne alkyd-based or water-borne latex-based base paints or stains.

For instance, U.S. Pat. No. 7,659,340 B2, 8,242,206 B2 and U.S. Published Patent Application No. 2017/0174924 A1 disclose a low VOC universal colorant composition that requires a combination of at least one hydrophobic, alkyd- or solvent-compatible surfactant and one hydrophilic, latex- or water-compatible surfactant. The combination of these two or more surfactants, which are low molecular weight (generally less than 1000 Daltons, number average) allow the colorant composition to be compatible in both solvent-borne alkyd base paints and stains as well as water-borne latex base paints and stains. Phosphate- or sulfate-based anionic surfactants were typically used for alkyd compatibility.

Alternatively, the universal colorant compositions of U.S. Pat. No. 9,040,624 B2, 9,187,614 B2, and U.S. Published Patent Application No. 2019/0031904 A1 require a phosphate-ester based surfactant, which similarly tends to negatively impact the viscosity of a tinted base paint or stain. In U.S. Pat. No. 10,934,151 B2 and U.S. Published Patent Application No. 2022/0010148 A1, a synergist is added to a solvent-based base paint or stain to make the base paint or stain more compatible with a universal colorant composition. Such a solution adds additional complexity, and requires distribution of an additional component, for a colorant system.

Each of these conventional solutions relies on the presence of surfactants to aid in wetting, dispersing, and stabilizing pigments, and providing the desired final compatibility of the colorant composition with solvent-based or water-based base paints or stains. Although surfactants in a universal colorant can help to wet, disperse, and stabilize pigments in both the colorant composition and a base paint or stain, surfactants may negatively impact some characteristics. For instance, in a water-borne paint or stain tinted with prior universal colorants, the tinted base paint or stain may have higher levels of volatile organic compounds (VOCs), surfactant leaching, increased tack, reduced blocking resistance and decreased tinted paint viscosity. In addition, architectural base paints and stains often include associative thickeners like hydrophobically modified, ethoxylated urethane resins (HEURs) or hydrophobically-modified alkali swellable emulsions (HASEs), and it is common for surfactants in prior universal colorants to negatively impact the thickener effectiveness, resulting in viscosity drop. Without being bound by theory, it is believed that surfactants present in a colorant composition out-compete an associative thickener for adsorption of the surface of latex particles in a paint or stain composition, resulting in a sometimes significant and undesirable decrease in tinted paint viscosity, which can appear to a consumer as a tinted paint or stain with an undesirable thin consistency.

Thus, there is a need to provide a universal colorant composition that can be used to tint both low VOC water-borne as well as solvent-borne base paints and stains, without comprising the performance of the resulting custom-tinted paint or stain product.

SUMMARY OF THE INVENTION

Disclosed are universal colorant compositions that include a modified polyether dispersant having one or more pigment affinic groups. Compositions of the present disclosure are capable of tinting both low VOC water-borne and solvent-based base paints and stains (and maintain the low VOC quality), with a decreased viscosity drop compared to existing universal colorant compositions. In contrast with prior universal colorant compositions, which required two or more low molecular weight surfactants (each surfactant being <1000 Daltons molecular weight) for compatability with alkyd components of a solvent-borne base paint or stain and latex components of a water-borne base paint or stain, universal colorant compositions of the present disclosure require only a single, relatively high molecular weight dispersant to assist in wetting and dispersing the pigment. The presence of pigment affinic groups in a dispersant allows the dispersant to wet a pigment in both water and solvent-based base paints or stains. The universal colorant compositions of the present disclosure are low VOC, and thus preferably can be used to tint low VOC water-borne base paints and stains.

In a first aspect, disclosed is a universal colorant composition comprising a vehicle, a pigment or dye, and a modified polyether dispersant, the polyether dispersant including one or more polyoxyalkyl, substituted or unsubstituted oxyphenyl, etherketone, polyetheretherketone, or cyclic oxide structural units, or combinations thereof; and wherein the pigment affinic groups are each an aliphatic or aromatic containing a plurality of carbon atoms; and wherein the modified polyether dispersant has a peak weight average molecular weight of at least about 1000 g/mol. In some approaches, the modifier polyether dispersant has a peak weight average molecular weight of at least 1500 g/mol, and in some approaches, at least 2000 g/mol.

In a second aspect, disclosed is a point-of-sale system for making custom-tinted water-borne or solvent-borne paints or stains, the system comprising an array of liquid colorant compositions each containing the universal colorant composition of the present disclosure.

In a third aspect, disclosed is a method of making a custom tinted paint or stain comprising adding one or more universal colorant compositions of the present disclosure to a base paint or stain.

In a fourth aspect, disclosed is a tinted paint or stain comprising one or more universal colorant compositions of the present disclosure and a base paint or stain.

The disclosed aspects may include other, optional features that may be combined alone or in combination with any other aspect.

Definitions

Unless the context indicates otherwise the following terms shall have the following meaning and shall be applicable to the singular and plural:

The terms "a," "an," "the," "at least one," and "one or more" are used interchangeably. Thus, for example, a system or method that includes "a" pigment means that the system or method may include "one or more" pigments.

The term "about," when used to describe an amount, means that the amount includes quantities for measurement error, experimental error, manufacturing error, trace amounts of the material that may or may not be present as measured.

The terms "architectural paints" and "architectural stains" respectively mean paints and stains for use on interior or exterior building or construction surfaces, e.g., walls, trim, floors, decks, railings, ceilings, roofs (including metal roofing, shingles and tiles), roadways, sidewalks, etc.

The term "array" when used with respect to colorants means an assortment of colorants intended to be used individually or in appropriate combinations to tint base paints or stains so as to provide user-customized colors in a wide gamut of hues. A typical array will normally contain at least white, green, blue and red colorant compositions, and usually will also contain one or more black colorant compositions, one or more yellow colorant compositions, and one or more oxide colorant compositions such as red oxide or yellow oxide. The individual colorants in a typical array will normally be supplied by a single manufacturer, be packaged in similar containers, bear similar labels each having a distinct SKU identifier, and may bear a unifying trademark for the array or for the brand of paint or stain with which the array is intended to be used.

The term "automated colorant dispenser" means a dispenser for paint or stain colorants which is controlled or controllable via electronically-regulated precision gravimetric weighing or volumetric metering devices so as to dispense controlled quantities of one or more colorants (e.g., water-only colorants) into a base paint or stain container and thereby facilitate preparation of tinted paints or stains whose tints are selected from an array of tints. The colorant types and amounts selected by such an automated colorant dispenser will optionally and preferably be controlled using software and a suitable database.

The term "base paint or stain" means a water-borne or solvent-borne paint or stain product packaged in a largely but incompletely filled point-of-sale container with a volume of about 0.2 to 20 L equipped with an openable and recloseable lid, cap or other closure, and which may be used as is but normally will be tinted at the point-of-sale by adding one or more colorants to the paint or stain product in its container, and stirring, shaking or otherwise mixing the container contents to compatibly and homogeneously disperse the colorant throughout the base paint or stain product.

The term "binder" means a natural or synthetic polymer suitable for use in a paint or stain.

The term "colorant" means a composition that can be added to (e.g., dispensed into) a point-of sale container whose interior volume is largely (e.g., two thirds of the container volume or more) but not completely already filled with a base paint or stain so as to alter the hue or lightness of such base paint or stain, and which contains pigment and a vehicle but is substantially free of binder.

The terms "compatible" and "compatibly" when used with respect to a colorant composition mean that if 4 fluid oz. of the colorant composition is added to a nominal (128 fluid oz.) gallon of base paint or stain and shaken for five minutes on a standard paint shaker, the colorant composition is dispersed throughout the base paint or stain and does not undergo visibly discernible separation when allowed to stand for one week at room temperature.

The term "custom-tinted" when used with respect to a system or method for tinting base paints or stains means that one or more colorants can be dispensed into a base paint or stain and mixed to provide finished paint or stains in a wide variety of (e.g., more than one hundred or even more than one thousand) preselected formulated colors or, if desired, a match for randomly-selected colors. The preselected formulated colors will ordinarily be viewed by potential end users using printed color charts or displayed computer images.

A "dispersant" is an additive that aids in the wetting, dispersing, and stabilizing of solid pigment in a liquid medium. and has a molecular weight equal or greater than 1000 g/mol.

A "surfactant" is an additive that aids in the wetting, dispersing, and stabilizing of solid particles in a liquid medium and has a molecular weight of less than 1000 g/mol.

A "low molecular weight surfactant" is a surfactant that has a molecular weight of less than 550 g/mol.

The terms "homogeneous" and "homogeneously" when used with respect to a colorant composition mean that if 4 fluid oz. of the colorant is added to a nominal (128 fluid oz.) gallon of base paint or stain and shaken for five minutes on a standard paint shaker, the colorant composition is uniformly dispersed throughout the base paint or stain without visibly discernible separation.

The term "liquid" when used to describe a material that can exist in several different phases refers to the phase occupied by that material at room temperature (23° C.) and 1 atm.

The term "volatile organic compound" ("VOC"), is defined by the Environmental Protection Agency (EPA) in 40 C.F.R. 51.100(s), to refer to any compound of carbon, excluding carbon monoxide, carbon dioxide, carbonic acid, metallic carbides or carbonates, and ammonium carbonate, which participates in atmospheric photochemical reactions as defined in the code, except for exempt compounds.

The terms "low volatile organic compound" and "low VOC" when used with respect to a colorant, paint or stain means that the colorant, paint or stain when in liquid form contains less than 50 grams per liter (g/L) of VOCs.

The term "manual colorant dispenser" means a non-automated dispenser for paint or stain colorants which is equipped with manually-movable pistons whose strokes have been indexed to manually meter quantities of one or more colorants into a base paint or stain container and thereby facilitate preparation of tinted paints or stains whose tints are selected from an array of tints.

The term "molecular weight" when used in reference to a polymeric material means the weight average molecular weight as determined using gel permeation chromatography and a polystyrene standard.

The term "paint" means a coating composition including pigment and binder which when applied to form a thin (e.g., 100 μm) wet thickness coating film on a freshly-sanded smooth wood surface, will when dried hide or substantially hide the wood grain and will present a new surface with its own appearance.

The term "pigment" means both colored, dispersible solid particulate materials and (in the interest of brevity) also colored dispersible or soluble dye materials, wherein the material imparts visually noticeable color to a base paint or stain when 5 wt. % (in the case of a colored, dispersible solid particulate) or 0.05 wt. % (in the case of a colored, dispersible or soluble dye) of the material is added to (e.g., dispensed into) the base paint or stain. The presence or absence of visually noticeable color may be assessed by preparing drawdown samples of the base paint or stain with and without the pigment, casting such samples as 25 μm dry thickness coated films over the white part of a BYK-Gardner No. PA-2811 opacity drawdown chart (from BYK-Gardner USA) or comparable chart, and examining the coated films under normal overhead interior illumination.

The term "pigment-to-dispersant ratio" means the weight ratio of the total weight of pigments present in a colorant composition to the total weight of modified polyether dispersants present in the colorant composition.

The terms "point-of-sale" and "retail" when used with respect to a site, location, store or other outlet means a place at which custom-mixed paints or stains are tinted and mixed in small batch lots (e.g., one half pint, one pint, one quart, one liter, one gallon, four liter, five gallon or 20 liter containers, corresponding to containers from about 0.2 to 20 L) for sale to end-users (e.g., painters, builders and homeowners). Representative point-of-sale retail, wholesale or combined retail/wholesale outlets include paint stores, hardware stores, building supply stores (including warehouses), and distribution centers.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "solid" when used to describe a material that can exist in several different phases refers to the phase occupied by that material at room temperature (23° C.) and 1 atm.

The term "solvent" when used in respect to a paint, stain or colorant means a non-aqueous organic liquid that dissolves or disperses other substances in the paint, stain or colorant, and is deemed to include both volatile and non-volatile and both reactive and non-reactive substances.

The term "solvent-borne" when used in respect to a paint, stain or colorant means that the major liquid vehicle or carrier for the paint, stain or colorant is a nonaqueous solvent or mixture of nonaqueous solvents. organic solvent-based paint. A solvent-borne paint or stain is a uniformly-dispersed mixture ranging in viscosity from a thin liquid to a semi-solid paste and includes a polymeric binder, an organic solvent carrier, pigment, colorant, tinting agent and/or metal effect agent; and other additives. The polymeric binder can be a drying oil, natural, semi-synthetic or synthetic resin such as polyacrylate, polyurethane, modified alkyd resin or other film-forming polymer. Included as well in the binder usually is a cross-linking agent, hardener, curing agent and/or secondary resin having crosslinking ability.

The term "substantially free of" when used with respect to an ingredient or composition means that the referenced ingredient or composition contains less than 0.1 wt. % of the recited component. The term "completely free" of a particular compound means that the recited material or composition contains less than 100 parts per million (ppm) of the compound.

The term "stain" means a coating composition including binder which when applied to form a thin (e.g., 100 μm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

The term "water-borne" when used in respect to a paint, stain or colorant means that the major liquid vehicle or carrier for the paint, stain or colorant is water. A water-borne paint or stain is a latex or emulsion paint ranging in viscosity from a thin liquid to a semi-solid paste, consisting of a resin dispersion and a dispersion of one or more pigments, colorants, tinting agents and/or metal effect agents, plus various paint additives, such as fillers and extenders. The binder in a water-borne paint or stain is typically a latex polymer such as an acrylic, methacrylic, or polyurethane polymer or copolymer.

Test Methods

Rub-up Test: The rub-up test assesses the compatibility of a colorant composition in a tintable base paint and its ability to become homogeneously dispersed in the paint or stain. The rub-up test is an estimate of in-field colorant compatibility and performance. Colorant is added to a base paint or stain and the tinted paint or stain is shaken on a RED-DEVIL cradle type paint shaker for 1 minute, followed by removal of a small aliquot of tinted paint. The remaining sample is shaken an additional 14 minutes, for 15 minutes total. Drawdowns are made using BIRD™ film applicators on white LENETA™ cards to compare the 1-minute and 15-minute shaken samples. An index finger and mild pressure are used to make even circular "rub-up" patterns on the upper outside edge of each coated film, applying shear to the coated areas without rubbing through the film, and normally using at least 5 and up to 25 rubs on each coated film. Rub-ups are rated on a visual None, Trace, Slight, Moderate or Severe scale, with ratings of Moderate or Severe being visibly objectionable. Thus, the rub-up test provides an assessment of the degree to which colorant separates from a tinted paint or stain due to incompatibility or non-homogeneity.

ΔE Colorimeter Test: Colorant is added to a base paint or stain and the tinted paint or stain is shaken on a RED-DEVIL cradle type paint shaker for 1 minute, followed by removal of a small aliquot of tinted paint. The remaining sample is shaken an additional 14 minutes, for 15 minutes total. Drawdowns are made using BIRD™ film applicators on white LENETA™ cards to compare the 1-minute and 15-minute shaken samples. Drawdowns of a tinted base paint or stain prepared by the above method are allowed to air dry. When dry, a spectrophotometer is used to measure the tint strength and CIELAB delta E color difference between the 1-minute and 15-minute shaken samples, with tint strength ratios from 90% to 110% for the 15-minute vs 1-minute shake times signifying acceptable compatibility, and with ratios from 95% to 105% signifying preferred acceptable compatibility.

Tint Strength Test: Tint strength is the degree to which a pigment or dye changes the color of a material. Tint strength indices are measured against a standard material define the ratio of the sample tint strength in relation to the standard. Tint strength is assessed using spectrophotometric instrumentation such as, but not limited to, a Datacolor DC500, DC800 or similar spectrophotometer, a D65 illuminant, CIE 1964 10° Standard Observer angle and reflectance mode, and is measured according to ASTM D4838-88 (2016).

Viscosity Drop Test: The Stormer KU (Krebs Unit) viscosity of an untinted sample of water-borne latex paint is measured according to ASTM D562-81. Then, ½ pint (8 fluid ounce) samples of water-borne latex paint are tinted at the maximum recommended colorant fill level and shaken on a RED-DEVIL cradle type paint shaker for 1 minute, followed by measurement in Krebs units of the Stromer KU viscosities of a shaken paint sample according to ASTM D562-10 (2018). The difference is recorded as the viscosity drop from addition of the colorant.

VOC: VOC content of a composition is measured by ASTM D6886-14e1 (Standard Test Method for Determination of the Weight Percent Individual Volatile Organic Compounds in Waterborne Air-Dry Coatings by Gas Chromatography), which uses methyl palmitate as a reference marker. A compound that elutes prior to the marker is considered VOC while a compound that elutes after the marker is not considered VOC. As used herein, the term "non-VOC" refers to compounds that elute after the methyl palmitate marker, or "exempt" from VOC in that the compounds that elute prior to methyl palmitate but are known to be less volatile than methyl palmitate, such as acetone and t-butyl acetate, for example. The term "exempt" may be used interchangeably with "non-VOC" when referring to a component of the compositions described herein.

DETAILED DESCRIPTION

Disclosed are universal colorant compositions for custom-tinting both water-borne and solvent-based base paints and stains. Universal colorant compositions of the present disclosure include at least one dispersant with pigment affinic groups to wet, disperse, and stabilize the pigment both in the colorant composition and in a base paint or stain following tinting. Colorant compositions including the dispersant with pigment affinic groups in some approaches may be formulated to include little to no VOCs. Colorant compositions of the present disclosure have universal compatibility to tint both water-borne and solvent-based paints and stains. Compositions of the present disclosure preferably are low VOC, and have lower impact on the viscosity of a base paint or stain when used to tint (e.g., viscosity drop) compared to prior colorant compositions.

Carrier

Universal colorant compositions of the present disclosure are water-borne and include an aqueous vehicle or carrier. Water is a preferred vehicle or carrier, and may for example be tap water, deionized water, desalinated (e.g., via reverse-osmosis) water, or distilled water. Cosolvents may assist in dispersing the pigment into the colorant or into a base paint or stain; may speed up, retard or otherwise change the time or emissions associated with drying; may improve wet edge properties or overlap characteristics; may improve freeze-thaw protection, or may provide or improve other features, and generally will not be retained in a film of the dried, cured or otherwise hardened paint or stain. Cosolvents present in the vehicle preferably are selected so the universal colorant composition contains less than 50 g/L VOC, preferably less than 20 g/L VOC, preferably less than 10 g/L VOC, or even more preferably, less than 5 g/L VOC.

A chosen cosolvent may be a hazardous air pollutant solvent (HAPS material) but preferably is a non-HAPS material or is substantially free of HAPS materials. Exemplary cosolvents typically have low molecular weights (e.g., up to about 700, up to about 600, up to about 500 or up to about 400 g/mol) and may for example include glycols (e.g., ethylene glycol, diethylene glycol, triethylene glycol, tetraethylene glycol and propylene glycol), glycol ethers (e.g., DOWANOL™ DPM and Butyl CELLOSOLVE™ from Dow Chemical Co.), alcohols (e.g., methanol, ethanol, n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.), ketones (e.g., diisobutyl ketone and ECOSOFT™ Solvent IK from Dow Chemical Co.), CARBOWAX™ 300 and CARBOWAX 600 polyethylene from Dow Chemical Co., mixtures thereof and the like. The colorants may for example contain at least about 8, at least about 10 or at least about 12 wt. % vehicles or carriers, and up to about 70, up to about 60 or up to about 50 wt. % vehicles or carriers.

Pigments

Universal colorant compositions of the present disclosure also include one or more pigments or dyes. A variety of pigments may be employed in the disclosed colorants (as well as in the base paints or stains), and will be familiar to persons having ordinary skill in the art. The pigments desirably form a stable dispersion that does not require agitation prior to use. In some instances a suitable pigment may also or instead be referred to commercially as a dye. Exemplary pigments include treated or untreated inorganic pigments and mixtures thereof, for example metallic oxides including titanium dioxide, iron oxides of various colors (including black) and zinc oxide; and metallic flakes such as aluminum flakes, pearlescent flakes, and the like. Exemplary pigments also or instead include treated or untreated organic pigments and mixtures thereof, for example carbon black, azo pigments, benzimidazolinones, carbazoles such as carbazole violet, diketopyrrolopyrroles, indanthrones, isoindolinones, isoindolons, perylenes, phthalocyanines, quinacridones and thioindigio reds. Suitable pigments are commercially available from a variety of commercial suppliers including BASF Colors & Effects GmbH, LANXESS, Cabot Corp, Ciba Specialty Chemicals, Clamant, Ferro Corporation, Shepherd Color Company, Sun Chemical and Tomatec America, Inc. Other exemplary pigments are described, for example, in U.S. Pat. No. 8,141,599 B2 (Korenkiewicz et al.), U.S. Pat. No. 8,746,291 B2 (Hertz et al.) and U.S. Pat. No. 8,748,550 B2 (Cavallin et al.). Colorants or colorant arrays containing entirely inorganic pigments or pigment mixtures may be preferred where custom-tinted paints or stains having maximum exterior durability are desired. In some embodiments, the colorant array includes non-infrared absorptive pigments for tinting dark exterior paints, and infrared-absorptive pigments for tinting dark interior paints, as described in U.S. Pat. No. 8,752,594 B2 (Gebhard et al.). The colorant compositions disclosed herein may for example contain at least about 2, at least about 3 or at least about 5 wt. % pigment and up to about 90, up to about 80 or up to about 70 wt. % pigment.

Film-Forming Binder

Colorant compositions of the present disclosure contain less than a film-forming amount of binder. That is, when applied to a surface, the colorant compositions do not form a continuous coating film upon drying unless it is first added to a base paint or stain that does contain a film-forming amount of binder. Consequently, if applied to a surface, dried and subsequently washed with water, the colorant composition (prior to addition to a base paint or stain) will wash away and not remain adhered to the surface.

Modified Polyether Dispersant Having Pigment Affinic Groups

To disperse, wet, and stabilize colorant composition pigments, universal colorant compositions of the present disclosure also include at least one modified polyether dispersant, the modification being the presence of one or more pigment affinic groups in the polyether dispersant. Universal colorant compositions of the present disclosure include at least 2 weight percent total of the modified polyether dispersants based on the wet weight of the colorant composition. In some approaches, the colorant compositions include at least 5 or at least 7 weight percent of modified polyether dispersants based on the wet weight of the colorant composition. Universal colorant compositions of the present disclosure include at most 20 weight percent of the modified polyether dispersants based on the wet weight of the colorant composition. In some approaches, universal colorant compositions of the present disclosure include at most about 15, or preferably at most about 12 weight percent total of the modified polyether dispersants based on wet weight of the colorant composition. While not wishing to be bound by theory, it is believed that the modified polyether dispersants in colorant compositions of the present disclosure wet, disperse, and stabilize pigments by adsorbing onto the particle and hindering agglomeration of particles by charge repulsion.

The polyether dispersant includes structural units joined through one or more ether linkages (C—O—C), which can provide the dispersant with hydrophobicity or hydrophilicity. The ether linkage may include may include one or more linear or branched polyoxyalkylene or polyacetal structural groups, such as an oxymethylene, oxyethylene, oxypropylene, or oxybutylene group. The oxypropylene may be a linear n-propylene oxide or a branched isopropylene oxide group. Similarly, the oxybutylene group may be an n-butylene oxide group or an isobutylene oxide group. If present, the polyoxyalkylenegroup has the following structure:

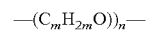

where m is the number of carbons in the polyoxyalkylene group and n is the number of repeated oxyalkylene groups. The polyether disperent may include one or more of the same or different polyoxyalkylene groups, in combination with other ether linkages disclosed herein.

The ether linkage may also include one or more oxyphenylene or polyphenyelene oxide structural groups having the following structure:

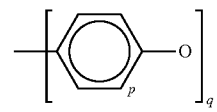

where p is the number of phenyl groups in the oxyphenylene and q is the number of repeated oxyphenylene groups.

The ether linkage may also include one or more polyetherketone structural groups having the following structure:

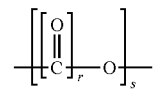

where r is the number of ketones in the etherketone group and q is the number of repeated etherketone groups.

The ether linkage may also include one or more polyetheretherketone structural groups having the following structure:

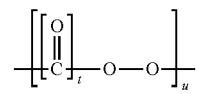

where t is the number of ketone groups in the ether ether ketone group and u is the number of repeated ether ether ketone groups.

The ether linkage may also include one or more cyclic ethers structural groups, such as oxirane or tetrahydrofuran moieties.

The ether linkage may include one or more ether linkages, alone or in combination with other ether linkage groups.

As a general matter, ether linkages that contain more short chain groups with a smaller number of carbon atoms (such as oxyethyl groups) provide more hydrophilicity, whereas linkages containing longer chains with more carbon atoms (e.g., oxypropyl, oxybutyl and longer chain) provide comparatively more hydrophilicity.

The polyether dispersant is modified in that it includes one or more pigment affinic groups. Pigment affinic groups present in the modified polyether dispersant wet, stabilize, and disperse pigments in both the universal colorant composition and in a tinted base paint or stain after tinting. A pigment affinic group includes a hydrophobic aliphatic or aromatic structural unit, or combinations thereof, having at least 4 carbon atoms. The pigment affinic group may be saturated or partially unsaturated. In addition, pigment affinic groups may be adjacent to, connected to, or terminated by an ester group or carboxylic acid group. A pigment affinic group may be unsubstituted, or in some approaches may be substituted with one or more nitrogen, oxygen, or fluorine atoms replacing a hydrogen atom. In some approaches, one or more carbon atoms within the pigment affinic group may be substituted as a silicon, oxygen, or nitrogen atom. An aliphatic portion of a pigment affinic group may be a linear or branched aliphatic chain. Pigment affinic groups of the present disclosure contain at least 4 carbon atoms, or in other approaches, at least 8, at least 10, or at least 12 carbon atoms. A pigment affinic group may be terminated by a carboxylic acid group. A pigment affinic group may include saturated or unsaturated fatty ester groups, such caprylic acid, capric acid, lauric acid, mysteric acid, palmitic acid, stearic acid, arachidic acid, behenic acid, lignoceric acid, or cerotic acid, or may be an unsaturated fatty acid like myristoleic acid, palmitoleic acid, sapienic acid, oleic acid, elaidic acid, vaccenic acid, linoleic acid, linoelaidic acid, arachidonic acid, or other fatty acids. The fatty acid group may be saturated or unsaturated and may have at least 8 carbon atoms, at least 14 carbon atoms, at least 18 carbon atoms, or at least 20 carbon atoms.

The modified polyether dispersant includes at least one pigment affinic group. If more than one pigment affinic group is present, the pigment affinic groups may be the same or different.

Dispersants of the present disclosure may include a mole ratio of pigment affinic groups to ether linkage groups of at least 1:20, preferably at least 1:15, 1:5, or 1:4.

Prior water-borne universal colorant compositions required inclusion of more than one surfactant to disperse the pigment and render the composition compatible with both solvent-borne and water-borne base paints and stains. Such surfactants comparably smaller molecules, having molecular weights of less than 1000 g/mol, usually less than 500 g/mol. The modified polyether dispersants of the present disclosure are relatively large compared to the multiple surfactant approach of prior approaches. In some approaches, the modified polyether dispersants of the present disclosure may have a single modal, bi-modal, or multi-modal molecular weight. The largest average molecular weight peak of the single or multiple modes has an average molecular weight of at least 1000 g/mol, or in other approaches, at least 1500 g/mol, or 2000 g/mol.

Furthermore, prior universal colorant compositions required more than one surfactant—at least one to provide compatibility with solvent-borne (e.g., alkyd-based) base paints or stains, and at least one to provide compatibility with water-borne (e.g, latex-based) base paints or stains. In contrast, compatibility of universal colorant compositions of the present disclosure is adduced by inclusion of pigment affinic groups present in a modified polyether dispersant. In some approaches, the universal colorant composition includes a single modified polyether dispersant, but in other approaches, the universal colorant composition includes more than one modified polyether dispersant, which may be the same or different dispersants, each with the same or different pigment affinic groups.

Thus, in contrast to colorant compositions of the present disclosure, each of the multiple surfactants employed to make prior universal colorant compositions compatible with both water-borne and solvent-borne base paints and stains generally had an average molecular weight of less than 1000 g/mol, typically less than 500 g/mol.

While not wishing to be bound by theory, it is believed that the relatively large molecular size of the modified polyether dispersant of the present disclosure sterically hinders movement of pigment particles in a universal colorant composition and in a tinted paint or stain. Consequently, inclusion of such a large molecule which groups that are affinic to pigment particles stabilizes pigment particles in the colorant composition and prevents settling. In addition, because the polyether dispersant is larger in molecular weight than previous surfactants, colorant compositions of the present disclosure have lower viscosity drop as compared to prior universal colorant compositions. In this way, inclusion of a modified polyether dispersant as in the universal colorant compositions of the present disclosure resists viscosity drop of the base paint or stain upon tinting.

Suitable modified polyether dispersants include: DISPERBYK-182, DISPERBYK-184, DISPERBYK-191, DISPERBYK-193, DISPERBYK-2061, DISPERBYK-2062, DISPERBYK-2090, BYK-3560, BYK-3565 from BYK-Chemie GmbH. ADD-6212, ADD-6230, ADD-6231, from ADD Additives BV. Other suitable modified polyether dispersants include TEGO® Dispers 650, TEGO® Dispers 651, TEGO® Dispers 653, TEGO® Dispers 655, TEGO® Dispers 656, from Evonik Operations GmbH. as well as Dispex® Ultra FA 4480, EFKA® 5220, EFKA® 6230, EFKA® 7500, from BASF SE, as well as Alkamuls® PSML-20PC, from Solvay SA.

In prior approaches, universal colorant compositions caused a disfavorable reduction in viscosity of a base paint or stain when the colorant is added to a base paint or stain. This reduction in viscosity affects the properties of the finished, tinted paint pr stain. For example, a paint or stain with low viscosity is difficult to apply, may not provide the necessary hide or coverage, and may not have the required block or tack resistance. Moreover, as base paints are made to have low or no VOC by using softer polymers or binder resins, and low or no VOC-containing colorants added to the base paint also have a high percentage of non-volatile soft components, it is difficult to form a hard film or coating that has good mechanical characteristics, i.e. block resistance, and tack resistance, for example.

Surprisingly, universal colorant compositions of the present disclosure provide for acceptable viscosity drop without required presence of multiple surfactants. In some embodiments, universal colorant compositions of the present disclosure provide for lower viscosity drop when added to a base paint or stain compared to prior approaches. As such, the present disclosure resists viscosity drop more than prior approaches.

Moreover, in some embodiments, universal colorant compositions of the present disclosure provide for a more uniform viscosity drop across colorant compositions. This is particularly desirable since more than one colorant composition (each with its own pigment and color) are used to tint a base paint or stain. Uniformity in the viscosity drop associated with all colorant compositions in an array of colorant compositions provides for more predictability in the viscosity drop expected when a base paint or stain is tinted.

The ratio of pigment to modified polyether dispersant varies depending on the one or more pigments, the one or more dispersants, and other additives present in the colorant composition. In some approaches, the pigment-to-dispersant ratio is greater than about 1. In some approaches, the pigment-to-dispersant ratio is less than about 20, or in other approaches, less than about 15, less than bout 6, less than about 4, or less than 2.5

Low VOC

In some approaches, the vehicle, dispersants, and other components of the universal colorant composition are selected to be low in VOCs. Preferably, the universal colorant composition contains less than 50 g/L VOC, preferably less than 20 g/L VOC, preferably less than 10 g/L VOC, and even more preferably, less than 5 g/L VOC.

Optional Surfactants

Although universal colorant compositions of the present disclosure may include one or more surfactants, the compositions preferably are essentially free of alkyl phenol ethoxylate surfacants (APEOs). These surfactants are usually made from a branched chain nonylphenol or octylphenol, which is reacted with ethylene oxide. In some approaches, the composition is also free of a phosphate-ester surfactant, while in other approaches the composition is essentially free of a phosphorous-based surfactant that contains an ethoxylate group. Such phosphorous-based surfactants are disfavored because, although they provide solvent-based compatibility, they tend to increase viscosity drop.

Preferably, the universal colorant composition is substantially free of surfactants having a molecular weight of less than 1000 g/mol, as inclusion of such surfactants may introduce viscosity drop that otherwise would be reduced compared to universal colorant compositions that do not include surfactants. Preferably, the universal colorant composition is completely free of surfactants having a molecular weight of less than 1000 g/mol.

Phospho-Lipid

In some approaches, the universal colorant composition includes a phospho-lipid to further stabilize the composition. In some approaches, the phospho-lipid is lechiten.

Optional Additives

Universal colorant compositions may, in some approaches, optionally include additional components or additives. In some approaches, the colorant compositions described herein include one or more preservatives, humectants, biocides, fillers, defoamers, pH control agents, thickeners, anti-settling agents, and mixtures or combinations thereof.

Pigments of universal colorant compositions of the present disclosure may be supplemented with extenders, inert pigments or fillers such as talc, china clay, barytes, carbonates, silicates and mixtures thereof, for example magnesium silicates, calcium carbonate, aluminosilicates, silica and various clays; organic materials including plastic beads (e.g., polystyrene or polyvinyl chloride beads), microspherical materials containing one or more voids, and vesiculated polymer particles (e.g., those discussed in U.S. Pat. Nos. 4,427,835, 4,920,160, 4,594,363, 4,469,825, 4,468,498, 4,880,842, 4,985,064, 5,5157, 084, 5,041,464, 5,409,776, and 5,510,422). Other exemplary extenders, inert pigments or fillers include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Finite Inc.), SPHERICEL™ hollow glass spheres (from Potter Industries Inc.), 3M ceramic microspheres including grades G-200, G-400, G-600, G-800, W-210, W-410, and W-610 (from 3M), 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S.A., Brazil). The colorants may for example contain at least about 0.5, at least about 1 or at least about 2 wt. % combined weight of pigment, extender, inert pigment and filler and up to about 80, up to about 70 or up to about 60 wt. % combined weight of pigment, extender, inert pigment and filler.

In some approaches, colorant compositions of the present disclosure include a humectant. The humectant is selected from dihydric alcohol (e.g., ethylene glycol), polyhydric alcohol (e.g., propylene glycol), polyether, and the like. In a preferred aspect, the humectant is a polyether. Exemplary polyethers include, without limitation, polyalkyl glycols (e.g., low to moderate molecular weight polyethylene and polypropylene glycols), polyhydroxy ethers (e.g., those formed from epoxide polymerization), polysaccharide compounds (e.g., polysorbitan and polysorbital), polyalkylene oxides (e.g., polyethylene and polypropylene oxide), and mixtures and combinations thereof.

In some approaches, the colorant compositions disclosed herein include about 1 wt % to wt % humectant, preferably about 2 wt % to 18 wt % humectant based on wet weight of the colorant composition. Polyethers suitable for the compositions and methods described herein include linear ethylene glycol polyethers of low molecular weight, e.g., having an average molecular weight of 190 to 210 g/mol and medium molecular weight polyethylene glycols, e.g., having an average molecular weight of from 285 to 315 g/mol, 385 to 415 g/mol, or 585 to 615 g/mol. Medium molecular weight polyethylene glycols are advantageous for use as vehicles because they are substantially free of ethylene glycols with 5 moles ethylene oxide or less.

Preferably, suitable ethylene glycol polyethers have an average molecular weight of from about 190 to about 800, more preferably from about 375 to 425 or 575 to 625. Particularly useful commercial polyethylene glycols are PEG 300, PEG 400, and PEG 600.

Another useful optional additive is a humectant such as, for example, the humectant GRB-2 from Zenica, which contains glycerin and a nonionic surfactant. Additional humectants which contains glycerin and a nonionic surfactant. Additional humectants useful in practicing the present disclosure include materials such as, for example, glycols such as ethylene glycol, propylene glycol, hexylene glycol, and the like; polyethylene glycols having molecular weights of about 300 g/mol, 400 g/mol, 500 g/mol, and the like; polypropylene glycols having molecular weights of about 300 g/mol, 400 g/mol, 500 g/mol, and the like; glycerin, sorbitol, sodium polyglutamate, modified urea compounds, polyethylene oxide and ethoxylated surfactants, and the like.

A defoaming agent may be added for ease of manufacture. Suitable defoamers include materials such as, for example, mineral oil, silica oil such as Drew L-474 from Ashland Chemical, or an organically modified silicone oil like Drew L-405 from Ashland Chemical, and the like.

A biocide may also be added to the colorant compositions of the present disclosure to eliminate or inhibit the growth of microorganisms. The biocide will generally account for between 0 and 1% by weight of the wet colorant composition. Biocidal chemicals include chlorinated hydrocarbons, organometallics, halogen-releasing compounds, metallic salts, organic sulfur compounds, quaternary ammonium compounds and phenolics. Useful commercial biocide examples are Troysan 192 from Arxada Corporation, Kathon LS from Lanxess Corporation, and the like.

A fungicide may also be added to the colorant compositions of the present disclosure to eliminate or inhibit the growth of microorganisms. Non-limiting examples of fungicides include compounds such as, for example, 3-Iodo-2-propynyl butyl carbamate (IPBC), chlorothalonil, Zinc Pyrithione, 2-N-octyl-4-isothiazalin-3-one, and the like. A preferred fungicide is IPBC.

Container for Distribution

The universal colorant compositions disclosed herein are typically distributed in a container, which is inserted into a custom-tinting machine for tinting base paints or stains at a point-of-sale retail location. In some approaches, a universal colorant composition may be provided in an easy-to-use container such as a tube, a syringe, or a caulking-type cartridge. In other approaches, the universal colorant compositions may be provided in sealed pouches allowing for the composition to be dispensed in controlled amounts. Suitable containers for use in the present disclosure include metal and plastic tubes (e.g., "toothpaste" style tubes), sealed plastic bags or pouches and caulking-tube cartridges (e.g., cartridges with plungers such as are described, for example, in U.S. Pat. Nos. 5,622,288; 5,560,521; and 5,297,697, which are herein incorporated by reference).

Colorant Composition Array

In another aspect, disclosed is a point-of-sale system for making custom-tinted water-borne and solvent-borne architectural paints and stains using an array of liquid universal colorant compositions as disclosed herein. The array preferably includes at least white, red, blue, and yellow universal colorant compositions. The point-of-sale system may be automated or manual. For instance, a variety of automated paint colorant dispensers may be used in the disclosed system and method, including the ACCUTINTER 1500, 2000, 7000 and 8000 series machines with a 1/384 fluid ounce (0.077 $cm^3$) minimum dispensing quantity from Fluid Management, Inc., and the Sample Dispensing System with a 1/1024 fluid ounce (0.029 $cm^3$) minimum dispensing quantity from Fluid Management, Inc. Additional automated paint colorant dispensers include the COROB MODULA HFmachine with a 1/192 fluid ounce (0.153 $cm^3$) minimum dispensing quantity from CPS Color Equipment, Inc., and the TATOCOLOR machine with a 1/384 fluid ounce (0.077 $cm^3$) minimum dispensing quantity from CPS Color Equipment, Inc. The chosen dispenser may for example have a minimum fluid dispensing quantity less than 0.01 fluid ounce (<0.3 $cm^3$), preferably less than 0.007 fluid ounce (<0.2 $cm^3$) and more preferably less than 0.005 fluid ounce (<0.15 $cm^3$). Dispensers with even smaller minimum dispensing quantities may be employed, e.g. less than 0.001 fluid ounce (<0.03 $cm^3$) or less than 0.0002 (<0.014 $cm^3$) minimum dispensing quantities, but such dispensers may also require longer amounts of time to prepare strong colors in large containers. To overcome this, the dispenser may be modified to provide multiple dispensing circuits for one or more colorants, e.g., a lower flow rate, lower minimum dispensing quantity circuit and a higher flow rate, higher minimum dispensing quantity circuit for at least some (e.g., the green, blue, red and magenta if used) colorants in the dispenser. These circuits may share some common components (e.g., the withdrawal line from a colorant canister, the colorant dispensing nozzle or nozzles, or nozzle cleaning devices) and may employ some unshared components (e.g., gear pumps). The somewhat increased equipment cost necessitated by such an approach will be offset by an increased fill rate when making strong colors in large containers and by a reduced or eliminated need to use separate dispensers to handle larger or smaller colorant volumes.

Universal colorant compositions each having a different color or pigment may be employed in the methods disclosed herein. The compositions and methods described herein preferably employ an array of 8, 9, 10, 11 or 12 colorants, but may employ fewer colorants where a limited color space is acceptable, or more colorants if additional dispenser slots are available, and an expanded color space is required and/or acceptable. To tint a base paint or stain, one or more colors of the universal colorant composition are added to a base paint or stain, in some approaches using point-of-sale tinting equipment, and the base paint or stain is mixed until uniform.

Preferably, the array of colorant compositions of the present disclosure includes less than 14 distinct colorant compositions, each having a different color. It has surprisingly been discovered that a 12-colorant composition array composed of colorants of the universal colorant compositions of the present disclosure can accurately custom-tint paint with the same breadth and specificity of tinted paint colors as those which required 14 of prior, commercially available colorant compositions.

Tinting Base Paint or Stain

In some approaches, universal colorant compositions of the present disclosure are gravimetrically added to a tintable base paint or stain such that the tinted paint or stain includes about 0.05 to 15 weight percent of one or more universal colorant compositions based on the wet weight of the colorant composition and the wet weight of the base paint or stain. In other approaches, universal colorant compositions are volumetrically added to a tintable base paint or stain such that the tinted paint or stain includes about 0.05 to 15 weight percent of one or more universal colorant compositions based on the wet weight of the colorant composition and the wet weight of the base paint or stain.

When added to a water-borne base paint or stain, universal colorant compositions of the present disclosure decrease the viscosity of the water-borne base paint or stain less than 20 Krebs Units, preferably less than 10 Krebs Units.

In some approaches, the universal colorant compositions described herein are substantially uniform and require little mixing prior to use. In an aspect, the colorant compositions described herein require up to about 3 minutes of mechanical shaking prior to use, but preferably no shaking is required at all, even after extended shelf life.

LIST OF EXEMPLARY EMBODIMENTS

The following is a non-exhaustive list of exemplary embodiments of the present disclosure. Other embodiments described in the present disclosure but not included in the list of exemplary embodiments are nonetheless embodiments of the present disclosure.

Embodiment 1: A universal colorant composition comprising:
    an aqueous vehicle,
    one or more pigments or dyes,
    and a modified polyether dispersant containing one or more pigment affinic groups;
    wherein the polyether dispersant includes one or more polyoxyalkyl, substituted or unsubstituted polyoxyphenyl, polyetherketone, polyetheretherketone, cyclic ether, or combinations thereof, and
    wherein the pigment affinic groups are each a saturated or unsaturated aliphatic or aromatic structural unit containing a plurality of carbon atoms;
    wherein the modified polyether dispersant has a peak weight average molecular weight of at least 1000 g/mol;
    wherein the universal colorant composition is substantially free of low molecular weight surfactants;
    wherein the universal colorant composition is compatible with water-borne and solvent-borne base paints and stains and is suitable for use in a point-of-sale tinting machine; and wherein the colorant composition contains less than a film-forming amount of binder.

Embodiment 2: The universal colorant composition of any preceding embodiment, wherein the colorant composition is substantially free of surfactants.

Embodiment 3: The universal colorant composition of any preceding embodiment, wherein the colorant composition comprises a first modified polyether dispersant including one or more pigment affinic groups; and a second modified polyether dispersant including one or more pigment affinic groups;

wherein the one or more pigment affinic groups of the first modified polyether dispersant are the same or different from the one of more pigment affinic groups of the second modified polyether dispersant.

Embodiment 4: The universal colorant composition of any preceding embodiment, wherein the polyoxyalkyl structural units include oxymethyl, oxyethyl, oxypropyl, or oxybutyl groups.

Embodiment 5: The universal colorant composition of any preceding embodiment, wherein the polyoxyalkyl structural units are oxyethyl groups.

Embodiment 6: The universal colorant composition of any preceding embodiment, wherein the cyclic ether groups are tetrahydrofuran or oxirane groups.

Embodiment 7: The universal colorant composition of any preceding embodiment, wherein the one or more modified polyether dispersants are present in a total amount of at least 2, at least 5, or at least 7 weight percent based on the wet weight of the colorant composition.

Embodiment 8: The universal colorant composition of any preceding embodiment, wherein the one or more modified polyether dispersants are present in a total amount of at most 20, at most 15, or at most 12 weight percent based on the wet weight of the colorant composition.

Embodiment 9: The universal colorant composition of any preceding embodiment, wherein at least one pigment affinic group is a linear or branched aliphatic chain having at least 4, at least 8, at least 10, or at least 12 carbons.

Embodiment 10: The universal colorant composition of any preceding embodiment, wherein the pigment affinic groups include an aromatic group.

Embodiment 11: The universal colorant composition of any preceding embodiment, wherein the pigment affinic group includes a branched or unbranched C10 alkyl chain.

Embodiment 12: The universal colorant composition of any preceding embodiment, wherein the pigment affinic groups include a saturated or unsaturated fatty acid having at least 14 carbon atoms.

Embodiment 13: The universal colorant composition of any preceding embodiment, wherein the pigment affinic groups include a saturated or unsaturated fatty acid having at least 18 carbon atoms.

Embodiment 14: The universal colorant composition of any preceding embodiment, wherein the pigment affinic groups include an unsaturated oleic or linoleic fatty acid.

Embodiment 15: The universal colorant composition of any preceding embodiment, wherein the dispersant has a mole ratio of pigment affinic groups to polyoxyalkyl groups of at least 1:20, preferably at least 1:15, 1:5, or 1:4.

Embodiment 16: The universal colorant composition of any preceding embodiment, wherein the one or more pigments or dyes are present in an amount of at least 2, or at least about 5 weight percent based on the wet weight of the colorant composition.

Embodiment 17: The universal colorant composition of any preceding embodiment, wherein the one or more pigments or dyes are present in an amount of at most about 90, or at most about 80, or at most about 70 weight percent based on the wet weight of the colorant composition.

Embodiment 18: The universal colorant composition of any preceding embodiment, wherein the composition contains less than 50 g/L VOC, preferably less than 20 g/L VOC, preferably less than 10 g/L VOC, or even more preferably, less than 5 g/L VOC.

Embodiment 19: The universal colorant composition of any preceding embodiment, wherein the modified polyether dispersant has a peak weight average molecular weight of at least 1500 g/mol, or at least 2000 g/mol.

Embodiment 20: The universal colorant composition of any preceding embodiment, wherein the colorant composition is essentially free of an alkyl phenol ethoxylate surfactant.

Embodiment 21: The universal colorant composition of any preceding embodiment, wherein the colorant composition is essentially free of a phosphate-ester surfactant.

Embodiment 22: The universal colorant composition of any preceding embodiment, wherein the colorant composition is essentially free of a phosphorous-based surfactant having an ethoxylate group.

Embodiment 23: The universal colorant of any preceding embodiment, wherein the universal colorant further comprises a phospho-lipid.

Embodiment 24: The universal colorant composition of embodiment 23, wherein the phospho-lipid is a lechitin.

Embodiment 25: The universal colorant composition of any preceding embodiment, wherein the colorant composition is essentially free of surfactants having an average molecular weight of less than 500 g/mol, preferably less than 1000 g/mol.

Embodiment 26: The universal colorant composition of any preceding embodiment, wherein when added to a base paint or stain, the viscosity of the base paint or stain decreases less than 20 Krebs Units, preferably less than 10 Krebs Units when measured according to the Viscosity Drop Test.

Embodiment 27: The universal colorant composition of any preceding embodiment, wherein the pigment-to-dispersant ratio is at least 1.

Embodiment 28: The universal colorant composition of any preceding embodiment, wherein the pigment-to-dispersant weight ratio is at most 20, at most 15, at most 6, at most 4, or at most 2.5.

Embodiment 29: A point-of-sale system for making custom-tinted water-borne and solvent-borne architectural paints and stains, the system comprising:

an array of universal colorant compositions of any preceding embodiment; the array including at least white, red, blue, and yellow colorant compositions, wherein when added to a base paint or stain, the universal colorant compositions resist negatively impacting the viscosity of tinted latex paints.

Embodiment 30: A method of making a tinted paint or stain comprising adding one or more universal colorant compositions of any preceding embodiment to a base paint or stain and mixing the tinted base paint or stain until uniform.

Embodiment 31: The method of embodiment 30, wherein the one or more universal colorant compositions are gravimetrically added to the base paint or stain.

Embodiment 32: The method of embodiment 30, wherein the one or more universal colorant compositions are volumetrically added to the base paint or stain.

Embodiment 33: A tinted paint or stain comprising:
a tintable base paint or stain; and
about 0.05 to 15 weight percent of one or more universal colorant compositions of any preceding embodiment.

Embodiment 34: A system for tinting a base paint or stain comprising:
an array of universal colorant compositions of any of embodiments 1 to 28, wherein the array includes at least twelve colorant compositions including at least white, red, blue, and yellow colors, and
a base paint or stain.

Embodiment 35: The system of embodiment 34, wherein when each of the universal colorant compositions are added to the base paint or stain, no more than 3, and preferably no more than 5, of the twelve colorant compositions, has more than a 10 KU viscosity drop.

EXAMPLES

The disclosure is illustrated by the following examples, which are not intended to be limiting on the disclosure. The particular examples, materials, amounts, and procedures are to be interpreted broadly in accordance with the scope and spirit of the disclosures as set forth herein. Unless otherwise indicated, all parts and percentages are by weight and all molecular weights are weight average molecular weight. Unless otherwise specified, all chemicals used are commercially available.

Example 1: Preparation Of Inventive Colorant Compositions

Colorant compositions were made by mixing water, pigment, and TEGO® Dispers 651, a modified polyether dispersant having approximately 14 moles polyoxyethylene structural units per equivalent, 1 mole C10 linear aliphatic structural units per equivalent, and 3 moles aromatic structural units per eqvvialent (peak Mw approx. 1500 g/mol), with conventional humectants, defoamers, preservatives, and thickeners. The colorants were ground using zirconium milling beads to a 7 Hegman fineness of grind value. Table 1 shows the amounts by weight percent included in each universal colorant composition.

TABLE 1

| | Components of Inventive Colorant Compositions (wt. %) | | | | | |
|---|---|---|---|---|---|---|
| | Yellow Colorant | Durable Yellow Colorant | Black Colorant | Umber Colorant | White Colorant | Durable Red Colorant |
| TEGO ® Dispers 651 | 9.11 | 10.73 | 9.44 | 11.01 | 6.26 | 12.98 |
| Water | 15.38 | 23.45 | 41.44 | 33.36 | 8.58 | 20.40 |
| Humectant | 14.86 | 6.41 | 8.60 | 9.91 | 6.15 | 7.70 |
| Defoamer | 0.65 | 0.36 | 0.39 | 0.55 | 0.16 | 0.54 |
| Preservative | 0.26 | 0.36 | 0.26 | 1.68 | 1.52 | 1.33 |
| Thickener | 0.13 | 1.29 | | 0.33 | 0.25 | |
| Inert Pigment | 11.52 | 12.22 | 30.00 | 6.80 | | 4.99 |
| Pigment PY 74 | 14.76 | 8.41 | | | | |
| PY 83 | | 0.80 | | | | |
| PY 184 | | 30.31 | | | | |
| PBk 7 | | | 9.87 | 0.14 | | |
| PBr 7 | | | | 19.38 | | |
| PW 6 | | | | | 56.85 | |
| PR 254 | | | | | | 17.86 |
| Extender Paste | 33.33 | 5.66 | | 16.84 | 20.23 | 33.95 |

Example 2: Comparison of Tinting of Base Paint Using Inventive and Existing Universal Colorant Compositions Colorant compositions of the present disclosure were prepared and compared to colorant compositions of the commercially available low VOC universal colorant system NovoColor™ II.[1] Colorant compositions of the NovoColor II colorant system were selected for comparison because they rely on a combination of a low molecular weight water-compatible surfactant and a low molecular weight solvent-compatible surfactant. The colorants were used to tint samples of a water-based acrylic latex paint, specifically Duration® Interior Acrylic Tint (formula A96W1251); and SWP Exterior Gloss Tint (formula A2W528) solvent-borne paint, both available from The Sherwin-Williams Company, Cleveland, Ohio. The water-borne base paints were tinted at 5 ounces colorant per gallon base paint. The solvent-borne base paints were tinted at 4 ounces colorant per gallon base paint. The tinted paints were then tested according to the Rub-up Test, and Colorimeter Test, and were assessed for tint strength.

TABLE 2

Tint Strength, ΔE, Rub-Up

| Colorant | | Base Paint | Paint Type | Tint Strength | CIE ΔE | Rub-up |
|---|---|---|---|---|---|---|
| Black Colorant | NovoColor II 8891 | SW Duration Int Acrylic Latex A96W1251 | Water-borne | 101.10% | 0.14 | None |
| | | SWP Exterior Gloss Oil Based A2W528 | Solvent-borne | 98.86% | 0.14 | None |
| | Black Colorant of Example 1 | SW Duration Int Acrylic Latex A96W1251 | Water-borne | 101.68% | 0.19 | None |
| | | SWP Exterior Gloss Oil Based A2W528 | Solvent-borne | 101.19% | 0.13 | None |
| Umber Colorant | NovoColor II 8888 | SW Duration Int Acrylic Latex A96W1251 | Water-borne | 100.55% | 0.25 | None |
| | | SWP Exterior Gloss Oil Based A2W528 | Solvent-borne | 102.80% | 0.23 | None |
| | Umber Colorant of Example 1 | SW Duration Int Acrylic Latex A96W1251 | Water-borne | 102.50% | 0.26 | None |
| | | SWP Exterior Gloss Oil Based A2W528 | Solvent-borne | 102.03% | 0.17 | None |
| Durable Red Colorant | NovoColor II 8851 | SW Duration Int Acrylic Latex A96W1251 | Water-borne | 99.22% | 0.30 | Slight Dark |
| | | SWP Exterior Gloss Oil Based A2W528 | Solvent-borne | 96.73% | 0.71 | None |
| | Durable Red Colorant of Example 1 | SW Duration Int Acrylic Latex A96W1251 | Water-borne | 100.08% | 0.16 | Trace Dark |
| | | SWP Exterior Gloss Oil Based A2W528 | Solvent-borne | 100.41% | 0.04 | None |

[1] Available from Color Corporation of America, Marengo, Illinois.

The data shows that the universal colorant compositions of the present disclosure have excellent compatibility with both water-borne and solvent-borne base paints Example 3: Comparison of Inventive and Commercially Available Colorant Compositions Viscosity Drop When Tinting Water-Borne Base Paint Colorant compositions of the present disclosure were compared to colorant compositions of the commercially available low VOC universal colorant system NovoColor™ II. Samples of Duration® Interior Matte Ultradeep (formula A96T1254) water-borne latex paint 2 were tinted at 10 ounce per gallon colorant and shaken on a cradle type machine shaker for 1 minute then viscosities measured. It can be appreciated that colorants of the present show less impact on the viscosity of the tinted paint compared to the commercially available NovoColor™ II colorants. Data is shown in Table 3.

TABLE 3

Viscosity Drop Measurements

| Sample | | Viscosity (KU) | Viscosity Drop (KU) | Percent Reduced Viscosity Drop |
|---|---|---|---|---|
| | Untinted Base Paint | 118 | | |
| Yellow Colorant | NovoColor II 8813 | 99 | 19 | |
| | Yellow Colorant of Example 1 | 105 | 13 | 31.6% |
| Durable Yellow Colorant | NovoColor II 8818 | 97 | 21 | |
| | Durable Yellow Colorant or Example 1 | 102 | 16 | 23.8% |
| Black Colorant | NovoColor II 8891 | 84 | 34 | |
| | Black Colorant of Example 1 | 109 | 9 | 73.5% |
| Umber Colorant | NovoColor II 8888 | 102 | 16 | |
| | Umber Colorant of Example 1 | 108 | 10 | 37.5% |
| White Colorant | NovoColor II 8800 | 104 | 14 | |
| | White Colorant of Example 1 | 114 | 4 | 71.4% |
| Durable Red Colorant | NovoColor II 8851 | 99 | 19 | |
| | Durable Red Colorant of Example 1 | 106 | 12 | 36.8% |

[2] Available from The Sherwin-Williams Company, Cleveland, Ohio

The data shows that the inventive universal colorant compositions have lower viscosity drop than existing universal colorant compositions such as colorants of the Novocolor® II universal colorant system. For some colors, the viscosity drop was decreased by more than 50% compared to existing solutions.

Example 4: Preparation of Inventive Colorant Compositions

Colorant compositions were made by mixing water, pigment, and TEGO® Dispers 653, a modified polyether dispersant, with conventional humectants, defoamers, preservatives, and thickeners. The colorants were ground using zirconium milling beads to a 7 Hegman fineness of grind value. Table 4 shows the amounts by weight percent of each universal colorant composition component based on the total weight of the colorant composition.

TABLE 4

Components of Inventive Colorant Compositions

| Component | | Yellow Colorant | Durable Yellow Colorant | Black Colorant | Umber Colorant | Durable Red Colorant |
|---|---|---|---|---|---|---|
| TEGO ® Dispers 653 | | 9.11 | 10.73 | 9.44 | 11.01 | 12.98 |
| Water | | 15.38 | 23.45 | 41.44 | 33.36 | 20.40 |
| Humectant | | 14.86 | 6.41 | 8.60 | 9.91 | 7.70 |
| Defoamer | | 0.65 | 0.36 | 0.39 | 0.55 | 0.54 |
| Preservative | | 0.26 | 0.36 | 0.26 | 1.68 | 1.33 |
| Thickener | | 0.13 | 1.29 | | 0.33 | 0.25 |
| Inert Pigment | | 11.52 | 12.22 | 30.00 | 6.80 | 4.99 |
| Pigment | PY74 | 14.76 | 8.41 | | | |
| | PY83 | | 0.80 | | | |
| | PY184 | | 30.31 | | | |
| | PBk7 | | | 9.87 | 0.14 | |
| | PBr7 | | | | 19.38 | |
| | PR254 | | | | | 17.86 |
| Extender Paste | | 33.33 | 5.66 | | 16.84 | 33.95 |

Example 5: Comparison of Tinting of Inventive And Existing Colorant Compositions to Tint Water-Borne and Solvent-Borne Base Paints Colorant compositions of the present disclosure were prepared and compared to colorant compositions of the commercially available low VOC universal colorant system NovoColor™ II. Colorant compositions of the NovoColor II colorant system were selected for comparison because for compatibility, they rely on a combination of a low molecular weight water-compatible surfactant and a low molecular weight solvent-compatible surfactant. The colorants were used to tint samples of a water-borne acrylic latex paint, specifically Sherwin-Williams Duration® Interior Acrylic Latex (formula A96W1251, identified by formula number in the "Base Paint" column of Table 5 below; and a solvent-borne paint, SWP Exterior Gloss Oil-based (formula A2W528, identified as "solvent-based" in the "Base Paint" column of Table 5 below), both available from The Sherwin-Williams Company, Cleveland, Ohio. The water-borne base paints were tinted at 5 ounces colorant per gallon base paint. The solvent-borne base paints were tinted at 4 ounces colorant per gallon base paint. The tinted paints were then tested according to the Rub-up Test, and Colorimeter Test, and were assessed for tint strength.

TABLE 5

Tint Strength, ΔE, Rub-Up

| | | | | 1 v 15 min Red Devil Shake | | |
|---|---|---|---|---|---|---|
| | Colorant | Base Paint | Paint Type | Tint Strength | ΔE | Rub-up |
| Yellow Colorant | NovoColor II 8813 | SW Duration Int Acrylic Latex A96W1251 | Water-borne | 100.87% | 0.11 | None |
| | | SWP Exterior Gloss Oil Based A2W528 | Solvent-borne | 112.75% | 2.16 | None |
| | Yellow Colorant of Example 4 | SW Duration Int Acrylic Latex A96W1251 | Water-borne | 100.63% | 0.20 | None |
| | | SWP Exterior Gloss Oil Based A2W528 | Solvent-borne | 104.14% | 0.68 | None |
| Durable Yellow Colorant | NovoColor II 8818 | SW Duration Int Acrylic Latex A96W1251 | Water-borne | 100.43% | 0.19 | None |
| | | SWP Exterior Gloss Oil Based A2W528 | Solvent-borne | 107.67% | 1.25 | None |
| | Durable Yellow Colorant of Example 4 | SW Duration Int Acrylic Latex A96W1251 | Water-borne | 100.18% | 0.14 | None |
| | | SWP Exterior Gloss Oil Based A2W528 | Solvent-borne | 101.64% | 0.35 | None |
| Black Colorant | NovoColor II 8891 | SW Duration Int Acrylic Latex A96W1251 | Water-borne | 101.14% | 0.13 | None |
| | | SWP Exterior Gloss Oil Based A2W528 | Solvent-borne | 99.64% | 0.07 | None |

TABLE 5-continued

Tint Strength, ΔE, Rub-Up

| Colorant | Base Paint | Paint Type | 1 v 15 min Red Devil Shake | | |
|---|---|---|---|---|---|
| | | | Tint Strength | ΔE | Rub-up |
| | Black Colorant of Example 4 | SW Duration Int Acrylic Latex A96W1251 | Water-borne | 101.15% | 0.13 None |
| | | SWP Exterior Gloss Oil Based A2W528 | Solvent-borne | 100.37% | 0.05 None |
| Umber Colorant | NovoColor II 8888 | SW Duration Int Acrylic Latex A96W1251 | Water-borne | 100.83% | 0.14 None |
| | | SWP Exterior Gloss Oil Based A2W528 | Solvent-borne | 104.65% | 0.39 None |
| | Umber Colorant of Example 4 | SW Duration Int Acrylic Latex A96W1251 | Water-borne | 100.49% | 0.06 None |
| | | SWP Exterior Gloss Oil Based A2W528 | Solvent-borne | 100.52% | 0.06 None |
| Durable Red Colorant | NovoColor II 8851 | SW Duration Int Acrylic Latex A96W1251 | Water-borne | 100.19% | 0.07 None |
| | | SWP Exterior Gloss Oil Based A2W528 | Solvent-borne | 96.71% | 0.70 None |
| | Durable Red Colorant of Example 4 | SW Duration Int Acrylic Latex A96W1251 | Water-borne | 99.59% | 0.16 None |
| | | SWP Exterior Gloss Oil Based A2W528 | Solvent-borne | 97.11% | 0.62 None |

The data shows that the universal colorant compositions of the present disclosure have excellent compatibility with both water-borne and solvent-borne base paints.

Example 6: Comparison Of Viscosity Drop Of Inventive And Existing Colorant Compositions Colorant compositions of the present disclosure were compared to colorant compositions of the commercially available low VOC universal colorant system NovoColor™ II. Samples of Duration® Interior Matte Ultradeep (formula A96T1254) water-borne latex paint 2 were tinted at 10 ounce per gallon colorant and shaken on a cradle type machine shaker for 1 minute then viscosities measured. It can be appreciated that colorants of the present show less impact on the viscosity of the tinted paint compared to the commercially available NovoColor™ II colorants. Data is shown in Table 6.

TABLE 6

Viscosity Drop Measurements

| | Sample | Viscosity (KU) | Viscosity Drop (KU) | Percent Reduced Viscosity Drop |
|---|---|---|---|---|
| | Untinted Base Paint | 122 | — | — |
| Yellow Colorant | NovoColor II 8813 | 106 | 16 | — |
| | Yellow Colorant of Example 4 | 102 | 20 | −25.0% |
| Durable Yellow Colorant | NovoColor II 8818 | 101 | 21 | — |
| | Durable Yellow Colorant of Example 4 | 104 | 18 | 14.3% |

TABLE 6-continued

Viscosity Drop Measurements

| | Sample | Viscosity (KU) | Viscosity Drop (KU) | Percent Reduced Viscosity Drop |
|---|---|---|---|---|
| Black Colorant | NovoColor II 8891 | 83 | 39 | — |
| | Black Colorant of Example 4 | 105 | 17 | 56.4% |
| Umber Colorant | NovoColor II 8888 | 96 | 26 | — |
| | Umber Colorant of Example 4 | 103 | 19 | 26.9% |
| Durable Red Colorant | NovoColor II 8851 | 83 | 39 | — |
| | Durable Red Colorant of Example 4 | 99 | 23 | 41.0% |

The data shows that the inventive universal colorant compositions have lower viscosity drop than existing universal colorant compositions such as colorants of the Novo-Color® II universal colorant system. For some colors, the viscosity drop was decreased by more than 50% compared to existing solutions.

Example 7: Preparation of Inventive Colorant Compositions

Colorant compositions were made by mixing water, pigment, and DISPERBYK®-2061, a modified polyether dispersant, with conventional humectants, defoamers, preservatives, and thickeners. The colorants were ground using zirconium milling beads to a 7 Hegman fineness of grind value. Table 7 shows the amounts of each component included in each universal colorant composition by weight percent based on the total weight of the colorant composition.

TABLE 7

Components of Inventive Colorant Compositions (wt. %)

| Component | | Yellow Colorant | Durable Yellow Colorant | Black Colorant | Umber Colorant | Durable Red Colorant |
|---|---|---|---|---|---|---|
| DISPERBYK ®-2061 | | 9.11 | 10.73 | 9.44 | 11.01 | 12.98 |
| Water | | 15.38 | 23.45 | 41.44 | 33.36 | 20.40 |
| Humectant | | 14.86 | 6.41 | 8.60 | 9.91 | 7.70 |
| Defoamer | | 0.65 | 0.36 | 0.39 | 0.55 | 0.54 |
| Preservative | | 0.26 | 0.36 | 0.26 | 1.68 | 1.33 |
| Thickener | | 0.13 | 1.29 | — | 0.33 | 0.25 |
| Inert Pigment | | 11.52 | 12.22 | 30.00 | 6.80 | 4.99 |
| Pigment | PY74 | 14.76 | 8.41 | | | |
| | PY83 | | 0.80 | | | |
| | PY184 | | 30.31 | | | |
| | PBk7 | | | 9.87 | 0.14 | |
| | PBr7 | | | | 19.38 | |
| | PR254 | | | | | 17.86 |
| Extender Paste | | 33.33 | 5.66 | — | 16.84 | 33.95 |

Example 8: Comparison To Commercially Available Universal Colorant Compositions Colorant compositions of the present disclosure were prepared and compared to colorant compositions of the commercially available low VOC universal colorant system NovoColor™ II. [1] Colorant compositions of the NovoColor II colorant system were selected for comparison because they rely on a combination of a low molecular weight water-compatible surfactant and a low molecular weight solvent-compatible surfactant. The colorants were used to tint samples of a water-borne acrylic latex paint, specifically Duration® Interior Acrylic Tint (formula A96W1251); and SWP Exterior Gloss Tint (formula A2W528) solvent-borne paint, both available from The Sherwin-Williams Company, Cleveland, Ohio. The water-borne base paints were tinted at 5 ounces colorant per gallon base paint. The solvent-borne base paints were tinted at 4 ounces colorant per gallon base paint. The tinted paints were then tested according to the Rub-up Test, and Colorimeter Test, and were assessed for tint strength.

TABLE 8

Tint Strength, ΔE, Rub-Up

| | | | | 1 v 15 min Red Devil Shake | | |
|---|---|---|---|---|---|---|
| Colorant | | Base Paint | Paint Type | Tint Str | ΔE | Rub-up |
| Yellow Colorant | NovoColor II 8813 | SW Duration Int Acrylic Latex A96W1251 | Water-borne | 100.87% | 0.11 | None |
| | | SWP Exterior Gloss Oil Based A2W528 | Solvent-borne | 112.75% | 2.16 | None |
| | Yellow Colorant of Example 7 | SW Duration Int Acrylic Latex A96W1251 | Water-borne | 100.67% | 0.13 | None |
| | | SWP Exterior Gloss Oil Based A2W528 | Solvent-borne | 104.02% | 0.64 | None |
| Durable Yellow Colorant | NovoColor II 8818 | SW Duration Int Acrylic Latex A96W1251 | Water-borne | 100.43% | 0.19 | None |
| | | SWP Exterior Gloss Oil Based A2W528 | Solvent-borne | 107.67% | 1.25 | None |
| | Durable Yellow Colorant of Example 7 | SW Duration Int Acrylic Latex A96W1251 | Water-borne | 101.43% | 0.20 | None |
| | | SWP Exterior Gloss Oil Based A2W528 | Solvent-borne | 119.99% | 3.36 | Trace Dark |
| Black Colorant | NovoColor II 8891 | SW Duration Int Acrylic Latex A96W1251 | Water-borne | 101.14% | 0.13 | None |
| | | SWP Exterior Gloss Oil Based A2W528 | Solvent-borne | 99.64% | 0.07 | None |
| | Black Colorant of Example 7 | SW Duration Int Acrylic Latex A96W1251 | Water-borne | 101.01% | 0.12 | None |
| | | SWP Exterior Gloss Oil Based A2W528 | Solvent-borne | 101.67% | 0.19 | None |

TABLE 8-continued

Tint Strength, ΔE, Rub-Up

|  |  |  |  | 1 v 15 min Red Devil Shake | | |
|---|---|---|---|---|---|---|
| Colorant | Base Paint | | Paint Type | Tint Str | ΔE | Rub-up |
| Umber Colorant | NovoColor II 8888 | SW Duration Int Acrylic Latex A96W1251 | Water-borne | 100.83% | 0.14 | None |
|  |  | SWP Exterior Gloss Oil Based A2W528 | Solvent-borne | 104.65% | 0.39 | None |
|  | Umber Colorant of Example 7 | SW Duration Int Acrylic Latex A96W1251 | Water-borne | 101.00% | 0.17 | None |
|  |  | SWP Exterior Gloss Oil Based A2W528 | Solvent-borne | 110.15% | 1.14 | Moderate Dark |
| Durable Red Colorant | NovoColor II 8851 | SW Duration Int Acrylic Latex A96W1251 | Water-borne | 100.19% | 0.07 | None |
|  |  | SWP Exterior Gloss Oil Based A2W528 | Solvent-borne | 96.71% | 0.70 | None |
|  | Durable Red Colorant of Example 7 | SW Duration Int Acrylic Latex A96W1251 | Water-borne | 99.60% | 0.15 | None |
|  |  | SWP Exterior Gloss Oil Based A2W528 | Solvent-borne | 97.66% | 0.64 | Trace Dark |

The data shows that the universal colorant compositions of the present disclosure have excellent compatibility with water-borne base paints. Some colors also have excellent compatibility with solvent-borne base paints. Other colors need further optimization to improve solvent-borne compatibility.

Example 9: Viscosity Drop Comparison to Existing Colorant Compositions

Colorant compositions of the present disclosure were compared to colorant compositions of the commercially available low VOC universal colorant system NovoColor™ II. Samples of Duration® Interior Matte Ultradeep (formula A96T1254) water-borne latex paint 2 were tinted at 10 ounce per gallon colorant and shaken on a cradle type machine shaker for 1 minute then viscosities measured. It can be appreciated that colorants of the present show less impact on the viscosity of the tinted paint compared to the commercially available NovoColor™ II colorants. Data is shown in Table 9.

TABLE 9

Viscosity Drop Measurements

|  | Sample | Viscosity (KU) | Viscosity Drop (KU) | Percent Reduced Viscosity Drop |
|---|---|---|---|---|
|  | Untinted Base Paint | 122 | — | — |
| Yellow Colorant | NovoColor II 8813 | 106 | 16 | — |
|  | Yellow Colorant of Example 7 | 92 | 30 | −87.5% |
| Durable Yellow Colorant | NovoColor II 8818 | 101 | 21 | — |
|  | Durable Yellow Colorant of Example 7 | 90 | 32 | −52.4% |

TABLE 9-continued

Viscosity Drop Measurements

|  | Sample | Viscosity (KU) | Viscosity Drop (KU) | Percent Reduced Viscosity Drop |
|---|---|---|---|---|
| Black Colorant | NovoColor II 8891 | 83 | 39 | — |
|  | Black Colorant of Example 7 | 93 | 29 | 25.6% |
| Umber Colorant | NovoColor II 8888 | 96 | 26 | — |
|  | Umber Colorant of Example 7 | 90 | 32 | −23.1% |
| Durable Red Colorant | NovoColor II 8851 | 83 | 39 | — |
|  | Durable Red Colorant of Example 7 | 88 | 34 | 12.8% |

The data shows that some of the inventive universal colorant compositions have lower viscosity drop than existing universal colorant compositions such as colorants of the NovoColor® II universal colorant system.

Example 10: Assessment of Uniformity of Viscosity Drop Across Base Paints and Stains Colorant compositions as in Table 10 were produced by mixing one or more modified polyether dispersants having pigment affinic groups with conventional humectants, defoamers, preservatives, and thickeners. The colorants were ground using zirconium milling beads to a 7 Hegman fineness of grind value. Table 7 shows the amounts of each component included in each universal colorant composition by weight percent based on the total weight of the colorant composition.

TABLE 10

Components of Inventive Colorant Compositions (wt. %)

| Component | Medium Yellow | White | Magenta | Raw Umber | Red | Durable Red | Organic Yellow | Durable Yellow |
|---|---|---|---|---|---|---|---|---|
| TEGO DISPERS 651 | 7.76 | 1.41 | 7.72 | 2.44 | 5.32 | 5.90 | 6.79 | 7.63 |
| HYDROPALAT WE 3317 | 1.81 | | | 9.28 | 5.67 | 4.84 | 1.95 | 2.24 |
| DISPERBYK 191 | | 2.04 | | 2.75 | | | | |
| Water | 42.61 | 26.43 | 37.67 | 40.47 | 42.11 | 38.98 | 44.70 | 28.85 |
| Humectant | 7.80 | 5.96 | 10.73 | 8.61 | 9.20 | 9.45 | 9.74 | 5.73 |
| Defoamer | 1.01 | 0.16 | 0.83 | 0.57 | 0.58 | 0.63 | 0.83 | 0.39 |
| Preservative | 1.85 | 0.73 | 0.77 | 0.72 | 1.76 | 1.71 | 1.73 | 0.76 |
| Thickener | 0.89 | 0.80 | 0.08 | 0.68 | 0.31 | 0.33 | 0.44 | 1.58 |
| Lecithin | | 3.08 | 6.08 | 6.23 | 6.84 | 5.92 | 2.06 | 2.52 |
| Inert Pigment | | | 29.06 | 7.21 | 19.85 | 14.20 | 16.89 | 14.49 |
| Pigment PY 65 | 23.02 | | | | 0.23 | | | |
| Pigment PY 74 | 13.25 | | | | 0.13 | | 14.87 | 7.74 |
| Pigment PW 6 | | 59.39 | | 1.14 | | | | |
| Pigment PR 122 | | | 7.06 | | | | | |
| Pigment PBk 7 | | | | 0.25 | | | | |
| Pigment PBr 7 | | | | 19.65 | | | | |
| Pigment PR 112 | | | | | 4.11 | | | |
| Pigment PR 209 | | | | | 3.89 | | | |
| Pigment PR 254 | | | | | | 18.04 | | |
| Pigment PY 184 | | | | | | | | 26.51 |
| Pigment PY 83 | | | | | | | | 1.56 |

To assess the viscosity drop compared to existing colorant compositions, each colorant composition was added volumetrically in the maximum volume of colorant permitted on the base paint or stain label to a one gallon container of the base paint or stain. As a control, the same test was performed using the same colors of the Novocolor II colorant composition array from the Sherwin-Williams Company, which includes a combination of a hydrophilic surfactant and a hydrophobic surfactant to make the colorant composition universal. KU (Stormer) viscosity of the base paint or stain was measured before and after addition of the colorant composition to assess the viscosity drop associated with each combination of colorant and base paint or stain. Viscosity drops between 5 KU and 10 KU are identified in underline and viscosity drops of more than 10 KU are identified in italics. Bracketed information indicates: [count of viscosity drops between 5 KU and 10 KU, count of viscosity drops above 10 KU].

| | | Viscosity Drop (KU)[3] | |
|---|---|---|---|
| Base Paint or Stain[4] | Colorant Fill (fl oz/gal) | Inventive Colorant Composition | Novocolor II Colorant Compositions |
| Pratt & Lambert Accolade ® Interior Premium Paint & Primer, Semi-gloss, Neutral Base | 18 | 1, 8, 4.7, *14.8*, *13.1*, *14.1*, 10.3, 10.1 [1, 6] | -2, *17.6*, *13.7*, *16.2*, *19.5*, *39.8*, *17.6*, *20.6* [0, 7] |
| Dutch Boy ® Forever ™ Interior 100% Acrylic Paint + Primer, Flat, Base D | 18 | *14*, 5, 3.1, 7.5, 6.6, 8, 5.7, 5.2 [5, 1] | 3, 9.4, 8.7, 8.3, 7, *18.6*, *11.7*, *10.1* [4, 3] |
| Dutch Boy ® Platinum ® Plus Interior 100% Acrylic Enamel Paint + Primer, Satin, Base B | 28 | 1, 3.9, 7.8, *17*, *17.7*, *17.2*, 8.6, 9 [4, 3] | *17*, *25.4*, *27.7*, *20.3*, *20.8* *27.7*, *20.4*, *19.5* [0, 8] |
| Dutch Boy ® Platinum ® Plus Interior 100% Acrylic Enamel Paint + Primer, Eggshell, Base B | 28 | 3, 5.4, -0.4, *21*, *17.4*, *13.4*, *11.1*, *11.4* [1, 6] | *19*, *22.5*, *20.4*, *22.9*, *18.2*, *26.7*, *22.9*, *20* [0, 8] |
| Dutch Boy ® Platinum ® Plus Interior 100% Acrylic Enamel Paint + Primer, Flat, Base B[5] | 28 | 2.4, *17.2*, *14.1*, *16.6*, 8.6, *12* [1, 4] | *19.4*, *19.6*, *15.1*, *33.9*, *20.4*, *21.6* [0, 6] |
| ColorPlace Classic Exterior House Paint, Flat, Accent Base, from Walmart Corp., Fayetteville, AR. | 12 | 5, 3.6, 2.9, 2, 0.6, 3.8, 3.2, 4.7 [1, 0] | 5, 4.1, 4.8, 0.6, 1.8, 6.3, 2, 5.9 [3, 0] |
| Dutch Boy ® Maxbond ™ Exterior, Satin, Neutral Base | 14 | 6, 7.2, *19.1*, 7.8, 2.3, 3.6, 2.4, 5 [3, 1] | 7, *10.6*, *17.9*, 3.9, 8.4, 14.5, 3.9, 5.2 [3, 3] |
| Dutch Boy ® Porch & Floor Int + Ext, Gloss, Neutral Base | 12 | 6, 7.5, 7.1, *16.3*, *11*, *11.4*, *11.5*, *12.5* [3, 5] | *14*, *19.8*, *22.7*, *21.8*, *22.4*, *26.6*, 8.9, *14.5* [1, 7] |
| Pratt & Lambert ® Aquanamel ™ Int + Ext, | 12 | 8, 7.7, 8.7, 9.1, 8.3, *11*, *12.5*, | *13*, *14.6*, *12.8*, *10*, *10.8*, *27.5*, *13.9*, |

-continued

|  | Colorant Fill (fl oz/gal) | Viscosity Drop (KU)[3] | |
|---|---|---|---|
| Base Paint or Stain[4] | | Inventive Colorant Composition | Novocolor II Colorant Compositions |
| Semi-Gloss, Neutral Base Sherwin-Williams ® Pro Industrial ™, Gloss, Clear Base | 12 | 9.5 [6, 2] 5, 17.1, 22.9, 21.5, 21.2, 20.2, 18.5, 20.5 [1, 7] | 13.8 [0, 8] 16, 28.5, 40.8, 23.3, 42.1, 31.5, 19.6, 24 [0, 8] |
| Valspar ® Seasonflex ® Exterior, Satin, Ultra Deep Base | 12 | 6, 7.7, 9.5, 15.6, 10.7, 14.1, 11.9, 12.8 [2, 6] | 12, 14.3, 16.6, 17.9, 15.4, 24.7, 16.4, 15.5 [0, 8] |
| HGTV Home ® by Sherwin-Williams ® Everlast ™, Exterior SemiGloss, Base 4 | 12 | 2, 2.3, 4.1, 6.8, 5.2, 7.1, 5.5, 7.3 [6, 0] | 10, 9.8, 7.5, 8.8, 3.8, 26.2, 13.9, 15.7 [3, 4] |
| Valspar ® Duramax ™ Exterior, Satin, Base 4 | 12 | 2, 3.8, 7.4, 7.2, 5, 7.3, 6.3, 5.3 [6, 0] | 2, 6.4, 6.7, 1.7, 9.1, 9.3, 4.4, 5.7 [6, 0] |
| HGTV Home ® by Sherwin Williams ® Infinity ™, Interior Semi-gloss, Base 4 | 12 | 6, 2.4, 3.2, 21.5, 16.6, 15.1, 15, 20.1 [1, 5] | 21, 25.3, 21.2, 25.8, 21, 36.5, 26.1, 29.3 [0, 8] |
| Valspar ® Signature ™ Interior, SemiGloss, Base 4 | 12 | 11, −4.8, −0.1, 12, 12.9, 15, 13.2, 9.1 [1, 5] | 23, 13.9, 16.3, 15.2, 12, 27.3, 21.8, 18.4 |
| Valspar ® Simplicity ™ Interior, Semi-Gloss, Base 4 | 12 | 14, 9.6, 5.6, 15.5, 13.1, 12.4, 12.6, 15.5 [2, 6] | 20, 16.4, 15.2, 14.4, 12.3, 25.7, 17.4, 21.7 [0, 8] |
| Valspar ® ExpressCoat ™ Interior, Eggshell, Neutral Base 4 | 12 | 7, 7.7, 2.8, 8.9, 2.5, 4.3, 6.9, 4.1 [4, 0] | 8, 4.4, 6.8, 6.9, 8.1, 6.6, 7.6, 4.1 [6, 0] |
| Valspar ® ExpressCoat ™, Interior, Semi-Gloss, Base 4 | 12 | 0, −3.6, −12.7, 16.3, 7.7, 3.3, 2.3, 2 [1, 2] | 8, 13.1, 5.7, 16.1, −3.8, 23.8, 13.2, 12.5 [1, 5] |

[3]Except as otherwise noted, viscosity drop data is presented in sequence of colors: Medium Yellow, White, Magenta, Raw Umber, Red, Durable Red, Organic Yellow, Durable Yellow.
[4]Except as otherwise noted, all base paints and stains are from The Sherwin-Williams Company, Cleveland, Ohio.
[5]Viscosity data in sequence of tested colorants Magenta, Raw Umber, Red, Durable Red, Organic Yellow.

The data shows that the inventive colorant compositions demonstrate less viscosity drop, and a more uniform viscosity drop across all colorants in the array, compared to existing colorant compositions.

What is claimed is:

1. A universal colorant composition comprising:
an aqueous vehicle,
one or more pigments or dyes,
and a modified polyether dispersant containing one or more pigment affinic groups;
wherein the polyether dispersant includes one or more polyoxyalkyl, substituted or unsubstituted polyoxyphenyl, polyetherketone, polyetheretherketone, cyclic ether, or combinations thereof, and
wherein the pigment affinic groups are each a saturated or unsaturated aliphatic or aromatic structural unit containing a plurality of carbon atoms;
wherein the modified polyether dispersant has a peak weight average molecular weight of at least 1000 g/mol;
wherein the universal colorant composition is substantially free of surfactants and dispersants other than the modified polyether dispersant;
wherein the universal colorant composition is compatible with water-borne and solvent-borne base paints and stains and is suitable for use in a point-of-sale tinting machine; and
wherein the colorant composition contains less than a film-forming amount of binder.

2. The universal colorant composition of claim 1, wherein the polyether dispersant includes oxymethyl, oxyethyl, oxypropyl, or oxybutyl polyalkyl structural groups.

3. The universal colorant composition of claim 2, wherein the polyether dispersant includes oxyethyl structural groups.

4. The universal colorant composition of claim 1, wherein the polyether includes tetrahydrofuran or oxirane groups.

5. The universal colorant composition of claim 1, wherein the one or more modified polyether dispersants are present in a total amount of at least 2 weight percent based on the wet weight of the colorant composition.

6. The universal colorant composition of claim 1, wherein the one or more modified polyether dispersants are present in a total amount of at most 20 weight percent based on the wet weight of the colorant composition.

7. The universal colorant composition of claim 1, wherein at least one pigment affinic groups include a linear or branched aliphatic chain having at least 4 carbons.

8. The universal colorant composition of claim 1, wherein at least one pigment affinic groups include an aromatic group.

9. The universal colorant composition of claim 1, wherein at least one pigment affinic groups include a branched or unbranched C10 alkyl chain.

10. The universal colorant composition of claim 1, wherein at least one pigment affinic groups include a saturated or unsaturated fatty acid having at least 14 carbon atoms.

11. The universal colorant composition of claim 1, wherein at least one pigment affinic groups include a saturated or unsaturated fatty acid having at least 18 carbon atoms.

12. The universal colorant composition claim 11, wherein at least one pigment affinic groups include an unsaturated oleic or linoleic fatty acid.

13. The universal colorant composition of claim 1, wherein the dispersant has a mole ratio of pigment affinic groups to polyoxylalkyl groups is at least 1:20.

14. The universal colorant composition of claim 1, wherein the pigments or dyes are present in an amount of at least 2 weight percent based on the wet weight of the colorant composition.

15. The universal colorant composition of claim 1, wherein the one or more pigments or dyes are present in an amount of at most about 90 weight percent based on the wet weight of the colorant composition.

16. The universal colorant composition of claim 1, wherein the composition contains less than 50 g/L VOC.

17. The universal colorant composition of claim 1, wherein the modified polyether dispersant has a peak weight average molecular weight of at least 1500 g/mol.

18. The universal colorant composition of claim 1, wherein the universal colorant further comprises a phospho-lipid.

19. The universal colorant composition of claim 18, wherein the phospho-lipid is a lecithin.

20. The universal colorant composition of claim 1, wherein the pigment-to-dispersant ratio is at least 1.

21. The universal colorant composition of claim 1, wherein the pigment-to-dispersant ratio is at most 20.

* * * * *